United States Patent [19]

Mori

[11] Patent Number: 4,982,723
[45] Date of Patent: Jan. 8, 1991

[54] ACCUMULATOR ARRANGEMENT FOR THE SUNLIGHT ENERGY

[76] Inventor: Kei Mori, No. 3-16-3-501, Kaminoge, Setagaya-ku, Tokyo, Japan

[21] Appl. No.: 548,427

[22] Filed: Nov. 3, 1983

[30] Foreign Application Priority Data

Nov. 10, 1982 [JP] Japan ................... 57-197135
Nov. 15, 1982 [JP] Japan ................... 57-200229

[51] Int. Cl.$^5$ .............................................. F24J 2/08
[52] U.S. Cl. ................... 126/440; 126/419; 126/442; 126/900
[58] Field of Search ............... 126/440, 419, 417, 428, 126/432, 442, 900; 350/96.1, 410

[56] References Cited

U.S. PATENT DOCUMENTS

| | | | |
|---|---|---|---|
| 3,908,632 | 9/1975 | Poulsen | 126/900 |
| 4,004,571 | 1/1977 | Schwerzel et al. | 126/452 |
| 4,033,118 | 7/1977 | Powell | 126/900 |
| 4,055,948 | 11/1977 | Kraus et al. | 126/438 |
| 4,137,899 | 2/1979 | Weslow | 126/440 |
| 4,188,941 | 2/1980 | Hopkin | 126/440 |
| 4,338,919 | 7/1982 | Hwang | 126/900 |
| 4,373,308 | 2/1983 | Whittaker | 126/417 |
| 4,394,858 | 7/1983 | Giordano et al. | 126/450 |
| 4,395,582 | 7/1983 | Dansher | 126/417 |
| 4,411,490 | 10/1983 | Danet | 126/440 |
| 4,424,805 | 1/1984 | Neary | 126/417 |
| 4,434,787 | 3/1984 | Young, II | 126/440 |
| 4,493,940 | 1/1985 | Takaoka | 126/418 |

FOREIGN PATENT DOCUMENTS

| | | | |
|---|---|---|---|
| 2907245 | 8/1980 | Fed. Rep. of Germany | 126/440 |
| 2502313 | 9/1982 | France | 126/440 |
| 0123056 | 7/1983 | Japan | 126/440 |
| 0142151 | 8/1983 | Japan | 126/440 |

Primary Examiner—James C. Yeung
Attorney, Agent, or Firm—Wegner, Cantor, Mueller & Player

[57] ABSTRACT

A solar energy accumulator arrangement including a plurality of optical systems for focusing the sunlight and a fluid passage in a transparent body which is disposed such that it passes through, or in the vicinity of, the optical systems, the fluid passage receiving an induction substance which induces a photochemical reaction by light energy and accumulates the energy.

5 Claims, 3 Drawing Sheets

4,982,723

1

ACCUMULATOR ARRANGEMENT FOR THE SUNLIGHT ENERGY

FIELD OF THE INVENTION

The present invention relates to an accumulator arrangement for sunlight energy.

BACKGROUND OF THE INVENTION

Recently, attention has been paid to sunlight energy with a view to saving energy or achieving clean energy, and active research and development have been undertaken for its effective utilization in various fields.

As an example, the present applicant has already come up with various techniques whereby sunlight energy is focused through a lens etc. into a photoconductor and transmit it therethrough to a desired place where it is used as light energy for the purpose of illumination or other purpose.

In the art, the technique has also been introduced, whereby the light is permitted to strike upon an induction substance to induce a photochemical reaction in that material and thereby accumulate the resulting light energy, and the thus accumulated energy is thereafter recovered as heat energy with the use of a catalyst (for instance, see Japanese Patent Publication No. 57-124657), and those skilled in the art have had increasing interest in that technique. It is thus feasible to use sunlight energy as heat energy, if the sunlight energy is accumulated in the induction substance However, when it is desired to accumulate solar energy in the induction substance, there is a fear that the photochemical reaction may not take place over the induction substance since the intensity of the sunlight varies depending upon weather and time. This is particularly true of the case where the sunlight energy is feeble. As a result, the amount of energy to be accumulated in the induction material is so reduced that a uniform and efficient build-up of energy may be unfeasible.

SUMMARY OF THE INVENTION

It is therefore a first object of the present invention to provide a solar energy accumulator arrangement in which the solar energy can uniformly and efficiently be accumulated in an induction substance as mentioned above.

Another object of the present invention is to provide an accumulator arrangement for sunlight energy designed to make efficient use of the sunlight energy by an effective combination of a technique whereby the sunlight is used as light energy as well as heat energy.

DETAILED DESCRIPTION OF THE INVENTION

Figure 1:
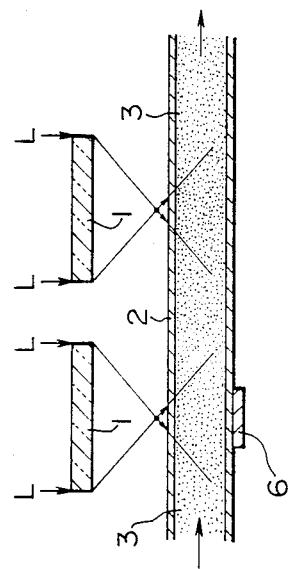

Referring to FIG. 1 showing part in section of the embodiment of the present invention, a lens 1 is provided for focusing the sunlight L. A transparent passage 2 for fluid is arranged on or in the vicinity of the focal point of the lens 1. Within the passage 2 there is an induction substance 3 capable of absorbing light energy to induce a photochemical reaction for the accumulation of energy, said material being adapted to flow in the direction indicated by an arrow. The lens 1 is controlled by known means (not illustrated) in such a manner that it directs automatically to the sun. The sunlight L focused through the lens 1 strikes upon the induction substance 3 received within the fluid passage 2 disposed on or in the vicinity of the focal point of the lens 1, and induces a photochemical reaction within the material 3, whereby the induction substance is converted into its isomer having a high energy level for the accumulation of energy. The induction substance in which the energy has been built up flows in the direction indicated by an arrow for recovery. Thereafter, when a catalyst is applied to the thus recovered induction substance, for example, at night, it returns to the original state while emitting heat which can then be used as heat energy. It is noted that the induction substance, which is now restored to the original state, can be re-used for the accumulation of energy. In the present invention, the sunlight is converged to increase its intensity, and allowed to strike upon the induction substance. Therefore, even when the incoming sunlight is feeble as experienced in cloudy weather or at dawn or dusk, it is possible to feed sufficient light energy to the induction substance, so that a photochemical reaction can effectively be induced in the induction substance. When the sunlight energy is feeble, the flow rate of the induction substance may be decreased, while when the sunlight energy is in a higher level, the flow rate of the induction substance may be increased. In this manner, even when the sunlight energy is feeble, it is possible to induce a uniform photochemical reaction over the induction substance. When the sunlight energy is at a higher level, it is possible to induce a photochemical reaction in a large amount of the induction substance, so that uniform and effective accumulation of the sunlight energy is achieved.

Figure 2:
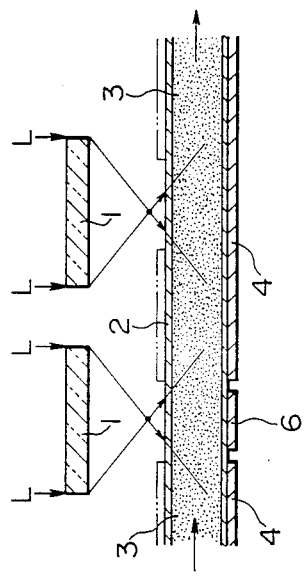

FIG. 2 is a longitudinal section of part of another embodiment of the present invention. As illustrated, the fluid passage 2 through which the induction substance 3 flows is provided on its outer wall with a solar cell 4, by which the sunlight energy can be used as electric energy. In such an arrangement, the light component having a short wavelength is absorbed in the induction substance, and does not reach the solar cell. It is unlikely that such a light component may be built up as heat energy and the efficiency of the solar cell may drop for that reason. While FIG. 2 illustrates the arrangement in which the solar cell 4 is disposed on the underside of the fluid passage, i.e., downstream of the optical path system for the sunlight focused through the lens 1, it may be disposed in an area outside the vicinity of the focal point of the lens 1, as indicated by a phantom line in the FIGURE, if a drop in the efficiency of the solar cell due to the accumulation of heat energy is insignificant.

Figure 3:
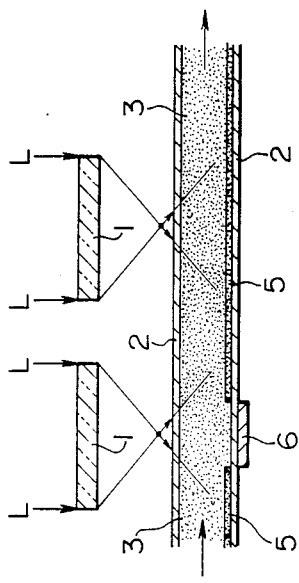
FIGS. 1 to 4 inclusive are sectional views showing part of the embodiment wherein the sunlight energy is accumulated as heat energy within an induction substance.

FIG. 3 is a longitudinal section of part of a further embodiment of the present invention. As illustrated, the fluid passage 2 through the induction substance flows is provided on its inner wall with a black body 5. In this arrangement, the heat energy of the sun entering the fluid passage 2 is effectively transmitted to the induction substance 3 to increase its temperature. Thus, when the induction substance is recovered, the heat energy carried by the induction substance can be used.

Figure 4:
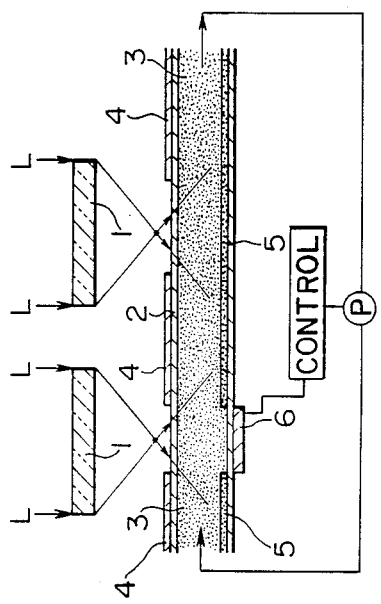

FIG. 4 is a longitudinal section of part of a still further embodiment of the present invention. As illustrated, the fluid passage is provided on its outer wall with the solar cell 4 and on its inner wall with the black body 5, whereby the sunlight energy can be used as either heat energy or electric energy.

While the present invention has been described with reference to several embodiments, the present invention is not limited thereto. For instance, when the present invention is applied within the atmosphere containing less ultraviolet rays, a sensitizer may be added to the induction substance, which converts the light component having a wavelength of less than about 360 mm into the light component having a wavelength of about 500 mm, whereby a photochemical reaction can more effectively be induced in the induction substance. When the flow rate of the induction substance is controlled depending upon the intensity of the sunlight, a light detecting cell 6 is disposed on a line extending from the focus of the lens 1 and on the outer surface of the underside of the fluid passage 2, as shown in FIGS. 1 to 4. The flow rate of the induction substance is controlled by the output signal of the cell 6, so that the light acting upon the induction substance is directly detected, thereby more effectively controlling the flow rate of the induction substance.

The embodiments in which the sunlight energy is accumulated in the induction substance have been described. In what follows, explanation will h=made to several embodiments wherein the aforesaid accumulator arrangement for the sunlight energy is effectively combined with the sunlight collector arrangement already proposed by the present applicant.

To make most effective use of the sunlight energy, it has to be applied as light energy without converting it into another form of energy such as light or electric energy. From this point-of-view, the present applicant has made various proposals about the sunlight collectors in which the sunlight energy is focused through a lens or the like into a photoconductor, through which it is transmitted to a place where illumination is needed. In the following embodiments, sunlight collector as mentioned above is effectively incorporated into the aforesaid arrangement for the conversion of the sunlight energy into heat energy, whereby the light and heat energies of the sunlight can simultaneously be utilized in a single unit.

Figure 5:
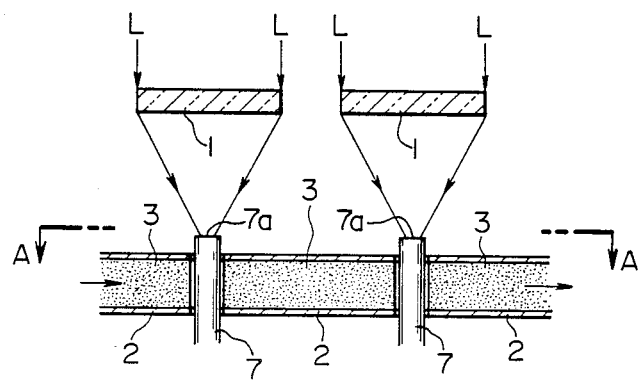
FIGS. 5 to 12 are views illustrative of the embodiment of the accumulator arrangement for the sunlight energy wherein the technique whereby the sunlight energy is used as light energy is combined with that whereby the sunlight energy is used as heat energy within an induction substance, FIG. 5 being a sectional view showing part of that embodiment, FIG. 6 being a plan view as viewed in the direction of the line A—A of FIG. 5, FIG. 7 being a view showing one embodiment of the photoconductor disposed at a certain position, FIGS. 8 to 11 being sectional views illustrative of the embodiment of the present invention, and FIG. 12 being a plan view of FIG. 11.
Figure 6:
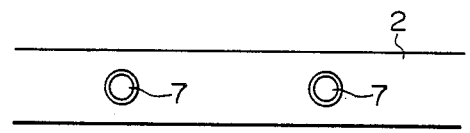

FIG. 5 is a longitudinal section illustrating part of a still further embodiment of the present invention, and FIG. 6 a view as viewed from the direction of the line A—A of FIG. 5. In these FIGURES, 1 is a lens for focusing the sunlight L, 7 a photoconductor having its light receiving end 7a disposed in the vicinity of the focal position of the lens 1, and 2 a fluid passage formed of a transparent body and disposed in the rear of the light receiving end 7a of the photoconductor 7. Within the fluid passage 2, there is an induction substance 3 to absorb light energy, cause a photochemical reaction and accumulate the energy, which flows, for instance, in the direction indicated by an arrow. In this embodiment, the lens 1 is controlled such that it directs automatically to the sun by means of a suitable device (not shown). The sunlight L focused through the lens 1 is introduced into the photoconductor 7 having its light receiving end 7a located at the focal point of the lens 1, through which it is transmitted to any desired place for the illumination or other purpose. A part of the sunlight which is not admitted into the photoconductor 7 strikes upon the induction substance 3 flowing through transparent fluid passage 2, giving rise to a photochemical reaction which converts the induction substance into its isomer for the accumulation of the energy. The induction substance which accumulates the energy flows in the direction indicated by an arrow for recovery. Thereafter, when a catalyst is applied, for instance, at night, it returns to its original state while giving off heat which can then be used as heat energy.

Figure 7:
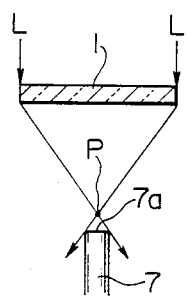

The induction substance which is now restored to the original state can be reused in the foregoing manner for the accumulation of energy. As mentioned above, the present invention makes it possible to introduce the sunlight focused through a lens or the like into a photoconductor through which it is transmitted to any desired place for the illumination or other purpose. In addition, a part of the sunlight which is not used of illumination can effectively be used to accumulate the energy in he induction substance, which is thereafter used as heat energy. According to the present invention, the sunlight can effectively be used. If the light receiving end 7a of the photoconductor 7 is located in the rear of the focal point P of ultraviolet rays, as illustrated in FIG. 7, the visible light is admitted into the photoconductor 7 without introducing thereinto the light component having a short wavelength, such as ultraviolet rays, and reaches the rear induction substance. In this manner, the sunlight can more effectively be used. It is noted that the induction substance reacts photochemically with the light component having a wavelength of no more than about 400 nm.

Figure 8:
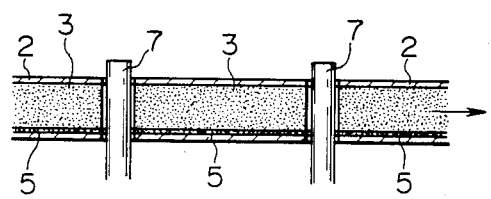

FIG. 8 is a longitudinal section showing part of a still further embodiment of the present invention. In this embodiment, the fluid passage 2 formed of a transparent body, through which the induction substance 3 flows, is provided on its inner wall with the black body 5 as illustrated, by which the sunlight energy entering the fluid passage 2 is effectively transmitted to the induction substance 3 to increase its temperature. In the recovery of the induction substance, the heat energy carried by said induction substance can be used.

Figure 9:
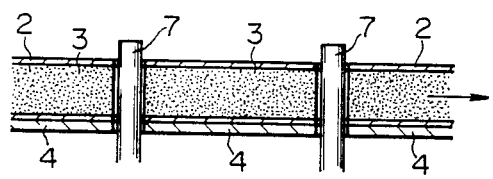
Figure 10:
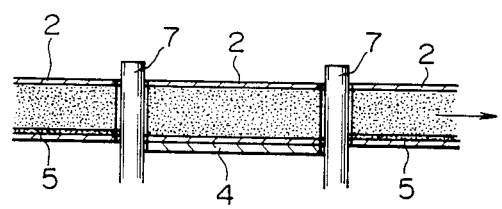

FIG. 9 is a longitudinal section showing part of a still further embodiment of the present invention, As illustrated, the fluid passage 2 formed of a transparent body, through which the induction substance 3 flows, is provided on its underside with the solar cell 4, upon which the light transmitted through the induction substance 3 acts effectively according to this embodiment, the sunlight can also be used as electric energy. With such an arrangement, the light component having a short wavelength is absorbed without reaching the solar cell. It is thus unlikely that such a light component may be accumulated as heat energy in the solar cell, and the efficiency of the solar cell may drop for that reason. As will easily be appreciated from FIG. 10, the black body 5 of FIG. 8 may be used in combination with the solar cell 4 of FIG. 9.

While the present invention has been described with reference to its specific embodiments, it is not limited thereto. For instance, if the flow rate of the induction substance is controlled in response to a detection signal resulting from the detection of the intensity of the sunlight, the energy is then more effectively accumulated in the induction substance. When the present invention is applied within the atmosphere containing less ultraviolet rays, a sensitizer may be mixed with the induction substance. The light component having a wavelength of no more than about 360 nm is converted by said sensitizer into the light component having a wavelength of about 500 nm, with the result that a photochemical reaction is more effectively induced in the induction substance.

Figure 11:
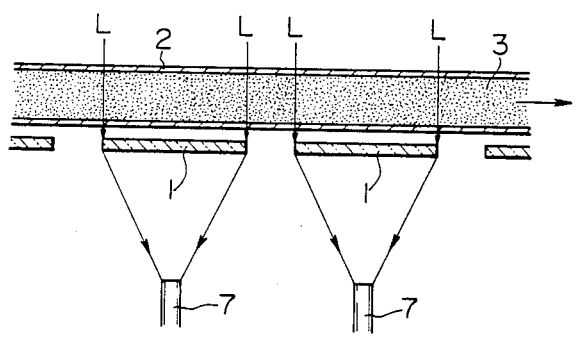
Figure 12:
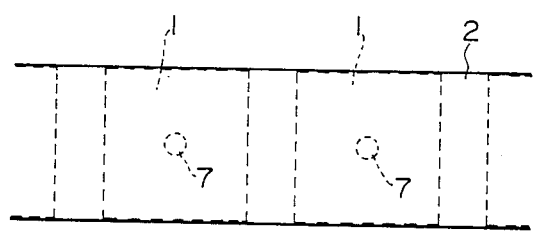

FIG. 11 is a longitudinal section showing part of a still further embodiment of the present invention, and FIG. 12 is a plan view of FIG. 11. This embodiment is effectively applied to the sunlight in outer space which contains large amounts of X-rays, shortwave ultraviolet rays such as vacuum ultraviolet rays and medium or long wave ultraviolet rays. The sensitizer required in the foregoing embodiments is dispensed with, since the sensitizer may be destroyed by intensive ultraviolet rays. The most characteristic feature of this embodiment is that intensive ultraviolet rays, etc. are absorbed in the induction substance without introducing thereinto light components having such a short wavelength, so that only the visible light of good quality and safety is admitted into the induction substance. Since the fluid passage 2 of a transparent body is disposed in front of the lens 1 in this embodiment, there is no need for the provision of any opening for the insertion of the photoconductor through the fluid passage. Hence, the fluid passage of a simple structure is easily be assembled at low cost.

What is claimed is:

1. A solar energy accumulator arrangement comprising a transparent conduit defining a fluid passage; an induction substance flowing through said fluid passage at a flow rate responsive to the intensity of sunlight, said induction substance being of a type which transforms to a higher energy level by a photochemical reaction to thereby accumulate solar energy from the light component thereof, whereby when the energy level of said induction substance returns to its original state, said energy is emitted as heat; a plurality of optical systems disposed to focus the sunlight onto said fluid passage to increase the intensity of said sunlight, said optical system focusing said sunlight sufficiently to transform said induction substance to a higher energy level by a photochemical reaction; and a solar cell disposed on the outer surface of a part of said fluid passage outside of said vicinity of said focal points.

2. A solar energy accumulator arrangement comprising a transparent conduit defining a fluid passage; an induction substance flowing through said fluid passage at a flow rate responsive to the intensity of sunlight, said induction substance being of a type which transforms to a higher energy level by a photochemical reaction to thereby accumulate solar energy from the light component thereof, whereby, when the energy level of said induction substance returns to its original state, said energy is emitted as heat; a plurality of optical systems disposed to focus the sunlight onto said fluid passage to increase the intensity of said sunlight, said optical system focusing said sunlight sufficiently to transform said induction substance to a higher energy level by a photochemical reaction; a solar cell disposed on the outer surface of a part of said fluid passage downstream of said optical systems and outside of said vicinity of said focal points; and a black body disposed on the inner surface of a part of said fluid passage downstream of said optical systems.

3. The arrangement as recited in any one of claims 1 or 2 in which said induction substance contains a photosensitizer.

4. A solar energy accumulator arrangement comprising a transparent conduit defining a fluid passage; an induction substance flowing through said fluid passage at a flow rate responsive to the intensity of sunlight, said induction substance being of a type which transforms to a higher energy level by a photochemical reaction to thereby accumulate solar energy from the light component thereof, whereby, when the energy level of said induction substance returns to its original state, said energy is emitted as heat; a plurality of optical systems disposed to focus the sunlight onto said fluid passage to increase the intensity of said sunlight, said optical system focusing said sunlight sufficiently to transform said induction substance to a higher energy level by a photochemical reaction; and a light detecting cell disposed on a line extending from the focal point of said lens and on the outer surface of the underside of said fluid passage, said cell producing an output signal in response to which the fluid flow rate of said induction substance is controlled.

5. The arrangement as recited in any one of claims 1, 2 or 4, wherein substantially the entire periphery of said conduit is transparent.

* * * * *